United States Patent [19]

Tomiyama et al.

[11] Patent Number: 5,777,969
[45] Date of Patent: Jul. 7, 1998

[54] DUAL-LAYERED OPTICAL DISC AND PICKUP HEAD

[75] Inventors: Morio Tomiyama, Daitou; Toshinori Kishi, Osaka, both of Japan

[73] Assignee: Matsushita Electric Industrial Co., Ltd., Osaka-fu, Japan

[21] Appl. No.: 659,520

[22] Filed: Jun. 6, 1996

[30] Foreign Application Priority Data

Jun. 8, 1995 [JP] Japan ................... 7-141537

[51] Int. Cl.⁶ ........................................ G11B 7/00
[52] U.S. Cl. ............................. 369/94; 369/275.1
[58] Field of Search ........................ 369/94, 275.1, 369/275.4, 286, 288, 275.3, 44.23, 100

[56] References Cited

U.S. PATENT DOCUMENTS 5,625,609  4/1997  Latta et al. ................... 369/94

Primary Examiner—Thang V. Tran
Attorney, Agent, or Firm—Wenderoth, Lind & Ponack, L.L.P.

[57] ABSTRACT

A dual-layered optical disc for use with a pickup head has a first signal layer, a semitransparent film, a space layer, a reflective film, and a second signal layer, all of which are deposited one upon the other in this order. A plurality of first signal pits are formed on one side of the first signal layer confronting the semitransparent film, while a plurality of second signal pits are formed on one side of the second signal layer confronting the reflective film. The first signal layer has a thickness selected so that when a read laser beam emitted from the pickup head is incident on the first signal layer in a direction generally perpendicular thereto, the focus position where the read laser beam is best focused is positioned within the space layer, thereby substantially equalizing jitters of signals played back from the first and second signal pits.

6 Claims, 4 Drawing Sheets

DUAL-LAYERED OPTICAL DISC AND PICKUP HEAD

BACKGROUND OF THE INVENTION

1. Field of the Invention

The present invention relates to the structure of a dual-layered high-density optical disc for use with a pickup head, and also relates to the design of the focus position of the pickup head.

2. Description of Related Art

Recently, a dual-layered optical disc having two signal planes both readable from one side is employed as one of standardized digital video discs (DVDs) and is promising for use as a future high-capacity recording medium.

A conventional dual-layered optical disc of this type generally has a first signal layer, a semitransparent film, a space layer, a reflective film, and a second signal layer, all of which are deposited one upon the other in this order. The first signal layer has a signal pit pattern formed on the semitransparent film side, while the second signal layer has another signal pit pattern formed on the reflective film side. The space layer is intended to separate the two signal layers from each other.

In playing back (reproducing) information stored on the first or second signal layer, the optical disc is set within a playback (reproducing) apparatus so that a laser beam emitted from a pickup head is incident from the first signal layer side. In designing an optical disc or a pickup head, it has been the general practice that a laser beam from the pickup head is best focused on the first signal layer.

However, when the focus position at which the laser beam is focused is shifted to the second signal layer for the reading of information stored thereon, the optical path length is extended due to the thickness of the space layer. As a result, aberration is generated and enlarges the diameter of the laser beam being focused is enlarged, as compared with the case where information on the first signal layer is being played back (reproduced). The laser beam having an enlarged diameter at the focus position is likely to play back neighboring signal pits to thereby lower the so-called jitters (variations in reading signals) of played-back (reproduced) signals.

SUMMARY OF THE INVENTION

The present invention has been developed to overcome the above-described disadvantages.

It is accordingly an objective of the present invention to provide an improved dual-layered high-density optical disc to which a laser beam emitted from a pickup head is applied so as to be best focused on a space layer interposed between two signal layers, thereby substantially equalizing jitters of signals played back from the two signal layers.

Another objective of the present invention is to provide an improved pickup head that emits a laser beam towards a dual-layered optical disc so that the laser beam may be best focused on a space layer interposed between the two signal layers.

In accomplishing the above and other objectives, the dual-layered optical disc according to the present invention is intended for use with a pickup head, and has a first signal layer, a semitransparent film, a space layer, a reflective film, and a second signal layer, all of which are deposited one upon the other in this order. The first signal layer has a plurality of first signal pits formed on one side thereof confronting the semitransparent film, while the second signal layer has a plurality of second signal pits formed on one side thereof confronting the reflective film. The signal layer has a thickness selected so that when a read laser beam emitted from the pickup head is incident on the first signal layer in a direction generally perpendicular thereto, the focus position where the read laser beam is best focused is positioned within the space layer, thereby substantially equalizing jitters of signals played back from the first and second signal pits.

Advantageously, the focus position of the laser beam is positioned at approximately the center of the space layer along an optical axis. In this case, the thickness of the first signal layer is smaller by about half the thickness of the space layer than a distance from an incident plane of the optical disc, on which the read laser beam is incident, to the focus position.

Conveniently, the thickness of the second signal layer is approximately equal to the thickness of the first signal layer.

Alternatively, the thickness of the second signal layer is greater by about half the thickness of the space layer than the thickness of the first signal layer.

It is preferred that the thickness of the first signal layer ranges from 0.56 mm to 0.58 mm.

It is also preferred that the semitransparent film has a reflectance ranging from 20% to 40%, while the reflective film has a reflectance greater than 70%.

It is further preferred that the space layer has a thickness ranging from 40 µm to 60 µm.

The focus position may be positioned between the semitransparent film and approximately the center of the space layer along an optical axis. In this case, when the first and second signal pits are played back, the intensity of light returning from the reflective film is selected so as to be greater than the intensity of light returning from the semitransparent film.

Alternatively, the focus position may positioned between the reflective film and approximately the center of the space layer along an optical axis. In this case, when the first and second signal pits are played back, the intensity of light returning from the semitransparent film is selected so as to be greater than the intensity of light returning from the reflective film.

On the other hand, the pickup head of the present invention comprises a light source for emitting a read laser beam and at least one playback lens, wherein the wavelength of the read laser beam and the numerical aperture of the playback lens are selected so that when the read laser beam is incident on the first signal layer in a direction generally perpendicular thereto, the focus position where the read laser beam is best focused is positioned within the space layer, thereby substantially equalizing jitters of signals played back from the first and second signal pits.

BRIEF DESCRIPTION OF THE DRAWINGS

The above and other objectives and features of the present invention will become more apparent from the following description of preferred embodiments thereof with reference to the accompanying drawings, throughout in which like parts are designated by like reference numerals, and wherein.

DETAILED DESCRIPTION OF THE PREFERRED EMBODIMENTS

Several embodiments of the present invention will be discussed hereinafter with reference to the accompanying drawings.

Embodiment 1

Figure 1:
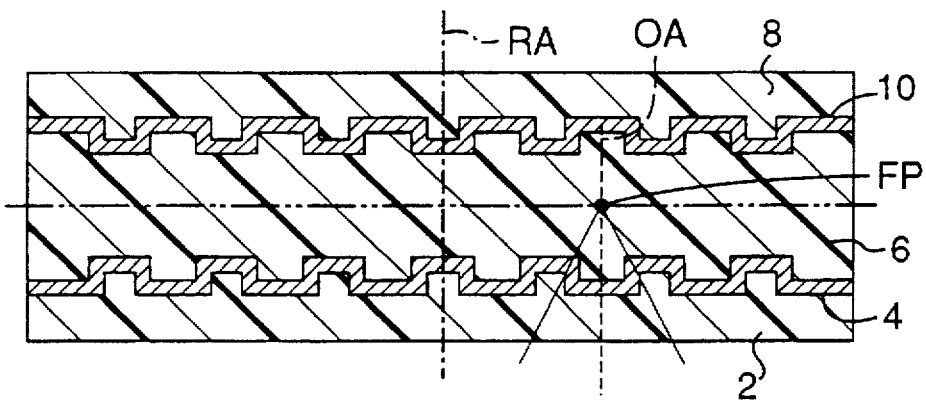
FIG. 1 is a vertical sectional view of a dual-layered optical disc of the present invention.

There is shown in FIG. 1 a dual-layered optical disc embodying the present invention to which a laser beam having a wavelength of about 650 μm is to be applied from one side using a pickup head with an object lens having a numerical aperture (NA) of about 0.6. By way of example, the following materials are used:

Substrates for signal layers: polycarbonate
Semitransparent film: Au
Space layer: UV-cured resin
Reflective film: Al As shown in FIG. 1, the optical disc comprises a first signal layer 2, a semitransparent film 4, a space layer 6, a reflective film 10, and a second signal layer 8, all of which are deposited one upon the other in this order. The first signal layer 2 is substantially transparent with respect to a read laser beam (allowing the laser beam to pass therethrough) and has a refractive index in the range of 1.45–1.65. The first signal layer 2 is made up of a disc having a thickness in the range of 0.56–0.58 mm and also having signal pits formed spirally on one side thereof by compression molding. During playback, the laser beam is incident on the optical disc invariably from the first signal layer 2. The semitransparent film 4 is deposited, by sputtering, on that side of the first signal layer 2 on which the signal pits have been formed. The semitransparent film 4 has a reflectance in the range of about 20–40% and hence reflects part of the incident light, while allowing the remaining light to pass therethrough. The semitransparent film 4 may be a dielectric film having a relatively low rate of light absorption. The space layer 6 is substantially transparent with respect to the read laser beam and has a refractive index in the range of about 1.35–1.75. The space layer 6 has a thickness in the range of about 20–30 μm on each side thereof as measured from a focus position FP along an optical axis OA generally perpendicular to the disc surfaces. The focus position FP is a position designed so that the laser beam emitted from the pickup head may be best focused thereon. The second signal layer 8 is of a structure substantially similar to that of the first signal layer 2 and is made up of a disc having signal pits formed spirally on one side thereof confronting the space layer 6. The reflective film 10 is deposited, by sputtering, on that side of the second signal layer 8 on which the signal pits have been formed, and has a reflectance greater than 70%. In FIG. 1, reference character RA denotes a rotational axis about which the optical disc rotates.

It is to be noted that the reflectances referred to above and those which will be referred to hereinafter indicate values measured by a spectro-photometer.

When information recorded on the above dual-layered optical disc is desired to be played back, the optical disc is set within a playback apparatus with the first signal layer 2 directed towards a pickup head. Prior to playback, the optical disc is first rotated about the rotational axis RA at a constant linear speed. When information on the first signal layer 2 is played back, the pickup head is focus-controlled so that a read laser beam incident on an object lens of the pickup head may be best focused on the first signal layer 2. The pickup head is then tracking-controlled to follow a row of signal pits, and reflected light from the signal plane is detected by a light detector and is read as analog signals. On the other hand, when information on the second signal layer 8 remote from the recording head is played back, the pickup head is focus-controlled so that the laser beam may be best focused on the second signal layer 8, and is then tracking-controlled to follow a row of signal pits. Signal detection is subsequently performed in the same manner as in the playback of the first signal plane.

Table 1 indicates jitters (variations in reading signals) of played-back signals when the two signal planes of the dual-layered optical disc of the present invention have been played back and those of played-back signals when two signal planes of a conventional dual-layered optical disc have been played back.

TABLE 1

|  | Conventional Disc | | Invention Disc | |
| --- | --- | --- | --- | --- |
|  | incident side | back side | incident side | back side |
| Jitter (%) | 5.5 | 7.5 | 6.5 | 6.5 |

As is clear from Table 1 above, according to the conventional dual-layered optical disc, the jitters of the played-back signals change depending on the signal plane to be played back, while according to the dual-layered optical disc of the present invention, the jitters of the played-back signals do not change for both of the signal planes, thus enabling playback from the different signal planes under the same conditions.

It is to be noted here that a generally available substrate having a thickness of 0.6 mm may be used for the second signal layer 8. Alternatively, the second signal layer 8 may have a thickness obtained by adding about half the thickness of the space layer 6 to the thickness of the first signal layer 2.

It is also to be noted that although the first and second signal layers 2 and 8 have been described as being made of polycarbonate, any other suitable material may be used therefor.

Embodiment 2

Figure 2:
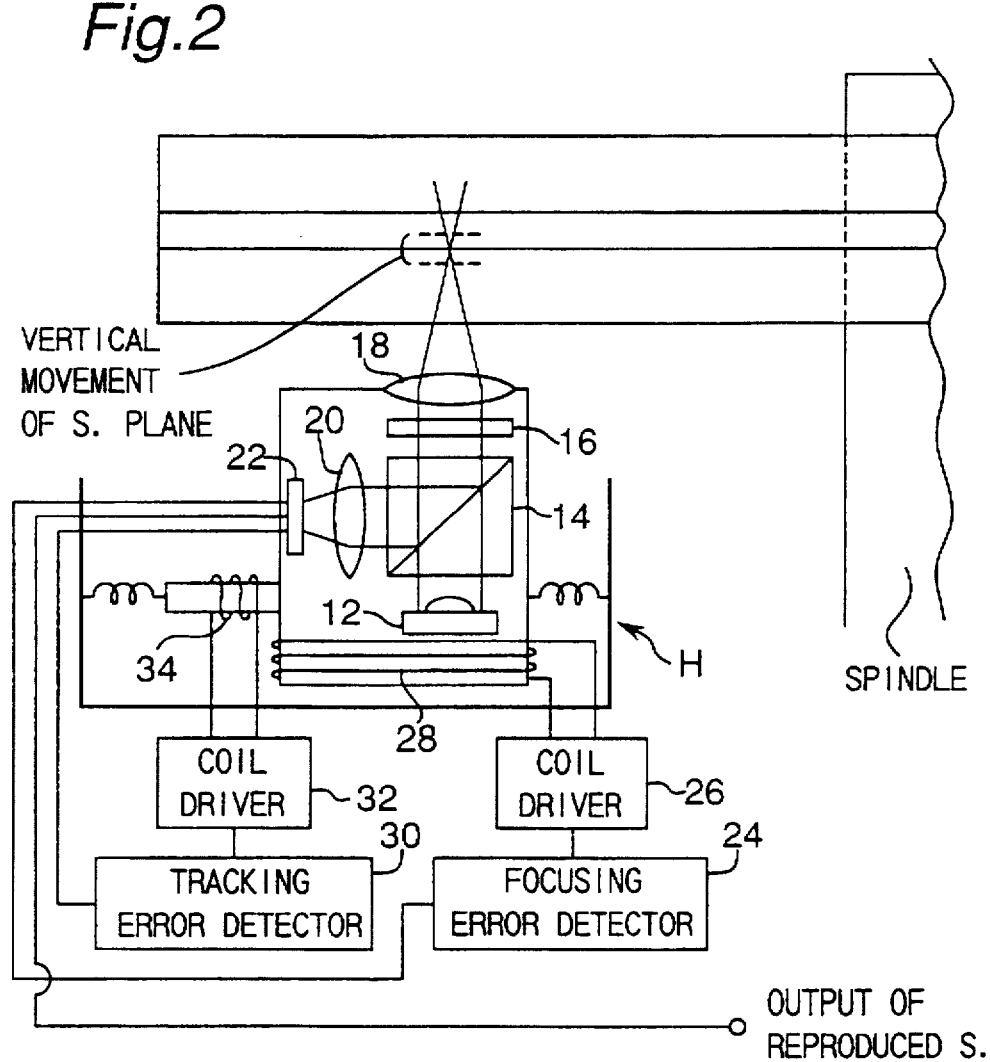
FIG. 2 is a schematic diagram of a playback apparatus employing a pickup head of the present invention.

FIG. 2 schematically depicts a pickup head H according to the present invention for playing back a dual-layered optical disc from only one side. Polycarbonate, Au, a UV-cured resin, and Al are used for the signal layer substrates, semitransparent film, space layer, and reflective film, respectively, as in Embodiment 1.

As shown in FIG. 2, the pickup head H of the present invention comprises a semiconductor laser 12 employed as a laser light source for emitting a read laser beam, a beam splitter 14 for allowing the laser beam emitted from the semiconductor laser 12 to pass therethrough while reflecting light reflected by the optical disc laterally by about 90°, a quarter-wave plate 16 disposed in front of the beam splitter 14, at least one playback lens 18 disposed in front of the quarter-wave plate 16, a converging lens 20 for converging a laser beam reflected by the beam splitter 14, and a light detector 22 for detecting a laser beam converged by the converging lens 20.

Figure 3:
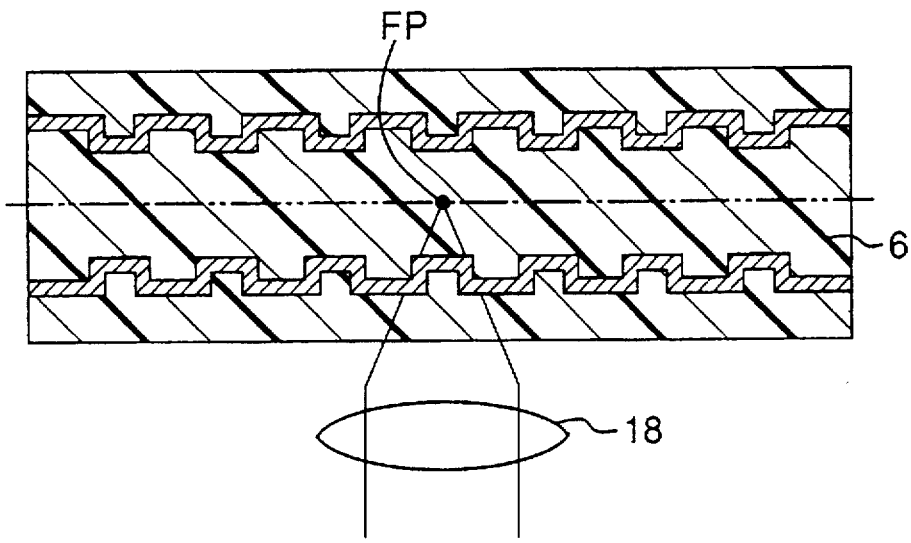
FIG. 3 is a vertical sectional view of a dual-layered optical disc to which a read laser beam from the pickup head shown in FIG. 2 is applied so as to be best focused on approximately the center of a space layer along an optical axis.

In the pickup head H of the above-described construction, the wavelength of the laser beam can be made shorter than the wavelength (about 650 nm) used hitherto by selecting another semiconductor laser, or the numerical aperture (NA) of the playback lens 18 can be made greater than the numerical aperture (about 0.6) used hitherto by selecting another playback lens. By so doing, the focus position FP at which the laser beam is best focused by the pickup head H is positioned between the first signal plane on which the laser beam is first incident and the second signal plane lying at the back of the optical disc. By way of example, the focus position FP can be positioned at a location on or close to the center line of the space layer 6 equally dividing the thickness thereof, as shown in FIG. 3.

Information recorded on the first signal plane of the conventional dual-layered optical disc is played back as follows using the pickup head H of the present invention.

The optical disc is first clamped at the center thereof and is subsequently rotated by a spindle at a constant linear speed. If the optical disc is somewhat warped, the rotation of the optical disc moves the first signal plane up and down as viewed from the stationary focus position FP. At this moment, as shown in FIG. 2, either the vertical position of the pickup head H or that of the optical disc is adjusted so that the first signal plane may move up and down centered on the focus position FP. In contrast, if the optical disc has no warp, either the vertical position of the pickup head H or that of the optical disc is adjusted so that the focus position FP may be positioned on the first signal plane.

The laser beam emitted from the semiconductor laser 12 passes through the beam splitter 14 and the quarter-wave plate 16 and is applied to the optical disc by the playback lens 18. Of the laser beam applied to the optical disc, that portion of the laser beam which has been reflected by the first signal plane is again incident on the playback lens 18, passes through the quarter-wave plate 16, and is reflected by the beam splitter 14. This laser beam is then converged by the converging lens 20 and is eventually incident on a plurality of segments of the light detector 22.

The laser beam so detected, i.e., an optical signal is converted by the light detector 22 into as many electric signals as the segments thereof, which are in turn inputted into a focusing error detecting circuit 24 and a tracking error detecting circuit 30. Upon operation of the plurality of electric signals, the focusing error detecting circuit 24 inputs into a coil driver 26 a focusing error signal indicating the amount of deviation from the focus position FP to the signal plane. The coil diver 26 supplies a vertically driving coil 28 with an electric current required for vertically driving the optical head so as to cancel the amount of deviation between the focus position FP and the signal plane, thus achieving the focus control. On the other hand, the tracking error detecting circuit 30 inputs, upon operation of the plurality of electric signals, into a coil driver 32 a tracking error signal required for following the signal pits. The coil diver 32 supplies a horizontally driving coil 34 with an electric current required for horizontally driving the optical head so as to cancel the amount of deviation of a playback laser spot from the signal pits to be played back, thus achieving the tracking control. Upon operation, the plurality of electric signals outputted from the light detector 22 are also used for a playback signal, which is read out as an analog signal.

On the other hand, when information recorded on the second signal plane remote from the pickup head H is played back, the pickup head H is focus-controlled to best focus the laser beam on the second signal plane and is then tracking-controlled to follow a row of signal pits. Eventually, a played-back signal is read out, as in the playback of the information on the first signal plane.

Table 2 indicates jitters of played-back signals when the two signal planes have been played back by the pickup head H of the present invention and those of played-back signals when the two signal planes have been played back by a conventional pickup head.

TABLE 2

|  | Conventional Head | | Invention Head | |
| --- | --- | --- | --- | --- |
|  | incident side | back side | incident side | back side |
| Jitter (%) | 5.5 | 7.5 | 6.5 | 6.5 |

As is clear from Table 2 above, the jitters of the signals played back by the conventional pickup head change depending on the signal plane to be played back, while the jitters of the signals played back by the pickup head H of the present invention do not change for both the signal planes, thus enabling playback from the different signal planes under the same conditions.

Embodiment 3

A dual-layered optical disc according to a modification of the present invention is hereinafter discussed by comparing it with the optical disc according to Embodiment 1.

The optical disc of Embodiment 1 was manufactured by way of trial, wherein polycarbonate was used for the substrates of the first and second signal layers 2 and 8, Au was used for the semitransparent film 4, a UV-cured resin was used for the space layer 6, and Al was used for the reflective film 10. The semitransparent film 4 was deposited on the first signal layer 2 so as to have a reflectance of about 25% with respect to light incident on the first signal layer 2, while the reflective film 10 was deposited on the second signal layer 8 so as to have a reflectance greater than 70%. By so doing, the intensity of light reflected by the reflective film 10 and returning to the pickup head was made substantially equal to that of light reflected by the semitransparent film 4. A laser beam having a wavelength of about 650 nm and a pickup head provided with an object lens having a numerical aperture (NA) of about 0.6 were employed. It is to be noted that an object lens having a numerical aperture of 0.6 has the least aberration at a depth of about 0.6 mm as measured from the incident plane into the signal layer substrate and the UV-cured resin.

When a laser beam emitted from the pickup head is incident on the optical disc of the above-described construction and is reflected by the reflective film 10 so as to return to the pickup head, the intensity of light is given by: (Intensity of light returning from reflective film (%))= (Transmittance of semitransparent film (%))×(Transmittance of resinous material (%))×(Reflectance of reflective film (%))

The optical disc according to a modified form of the present invention was manufactured by way of trial, wherein polycarbonate was used for the signal layer substrates, Au was used for the semitransparent film, a UV-cured resin was used for the space layer, and Al was used for the reflective film. The semitransparent film had a reflectance of about 20% with respect to light incident on the first signal layer, while the reflective film had a reflectance greater than 70%. A laser beam having a wavelength of about 650 nm and a pickup head provided with an object lens having a numerical aperture (NA) of about 0.6 were employed and were hence identical to those of the optical disc of Embodiment 1.

According to the above-described construction, when a laser beam emitted from the pickup head is incident on the optical disc and is reflected by the reflective film so as to return to the pickup head, and when the same material as that of the optical disc of Embodiment 1 is used for the substrates, the intensity of light reflected by the reflective film and returning to the pickup head is greater than that of light reflected by the semitransparent film.

Figure 4:
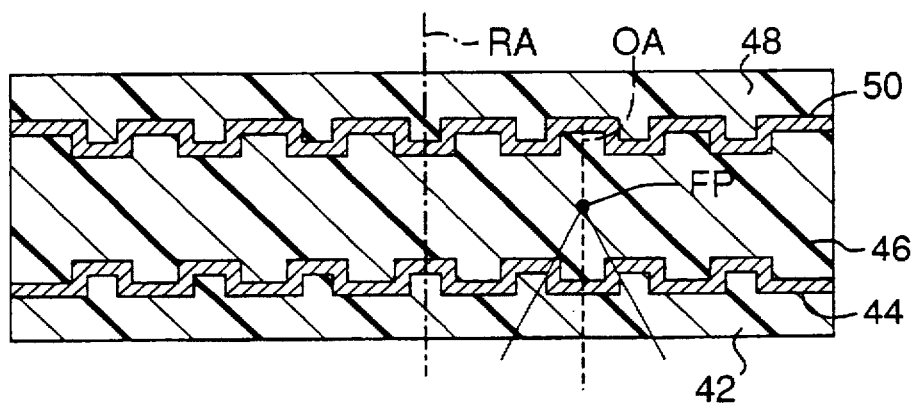
FIG. 4 is a view similar to FIG. 1, but showing a modification thereof.

FIG. 4 depicts a dual-layered optical disc according to Embodiment 3 of the present invention.

The optical disc shown in FIG. 4 comprises a first signal layer 42, a semitransparent film 44, a space layer 46, a reflective film 50, and a second signal layer 48, all of which are deposited one upon the other in this order. The first signal layer 42 is substantially transparent with respect to a read laser beam and has a refractive index in the range of 1.45–1.65. The first signal layer 42 is made up of a disc having a thickness in the range of 0.56–0.58 mm and also having signal pits formed spirally on one side thereof, for example, by compression molding. The signal pits have a track pitch of about 0.74 μm and a shortest pit length of about 0.44 μm. The semitransparent film 44 is deposited, for example, by sputtering, on that side of the first signal layer 42 on which the signal pits have been formed. The semitransparent film 44 has a reflectance in the range of about 20–40% and hence reflects part of the incident light, while allowing the remaining light to pass therethrough. The space layer 46 is substantially transparent with respect to the read laser beam and has a thickness in the range of about 20–30 μm on each side thereof as measured from the focus position FP along an optical axis OA generally perpendicular to the disc surfaces. The second signal layer 48 is of a structure substantially similar to that of the first signal layer 42 and is made up of a disc having a refractive index in the range of 1.45–1.65 and a thickness in the range of 0.56–0.58 mm and also having signal pits formed spirally on one side thereof confronting the space layer 46. The signal pits have a track pitch of about 0.74 μm and a shortest pit length of about 0.44 μm. The reflective film 50 is deposited, for example, by sputtering, on that side of the second signal layer 48 on which the signal pits have been formed, and has a reflectance in the range greater than 70%. In FIG. 4, reference character RA denotes a rotational axis about which the optical disc rotates.

When information recorded on the above dual-layered optical disc is desired to be played back, the optical disc is set within a playback apparatus with the first signal layer 42 directed towards a pickup head. When information on the first signal layer 42 is played back with the optical disc being rotated about the rotational axis RA, the pickup head is first focus-controlled so that a read laser beam incident on an object lens of the pickup head may be best focused on the first signal layer 42. The pickup head is subsequently tracking-controlled to follow a row of signal pits, and reflected light from the signal plane is detected by a light detector and is read as analog signals. On the other hand, when information on the second signal layer 48 remote from the recording head is played back, the pickup head is focus-controlled so that the laser beam may be best focused on the second signal layer 48, and is then tracking-controlled to follow a row of signal pits. Signal detection is then performed in the same manner as in the playback of the first signal plane.

Figure 5A:
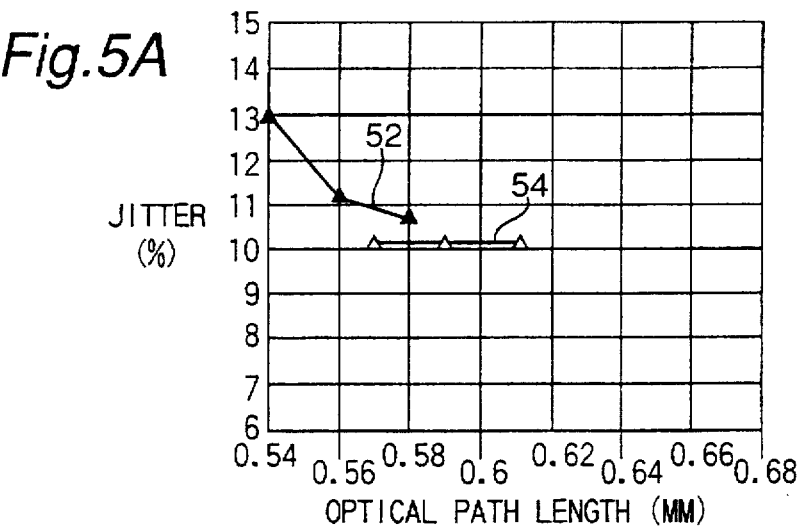
FIG. 5A is a graph indicating jitters of signals played back from the optical disc of FIG. 1 when the space layer has a thickness of about 30 μm.
Figure 5B:
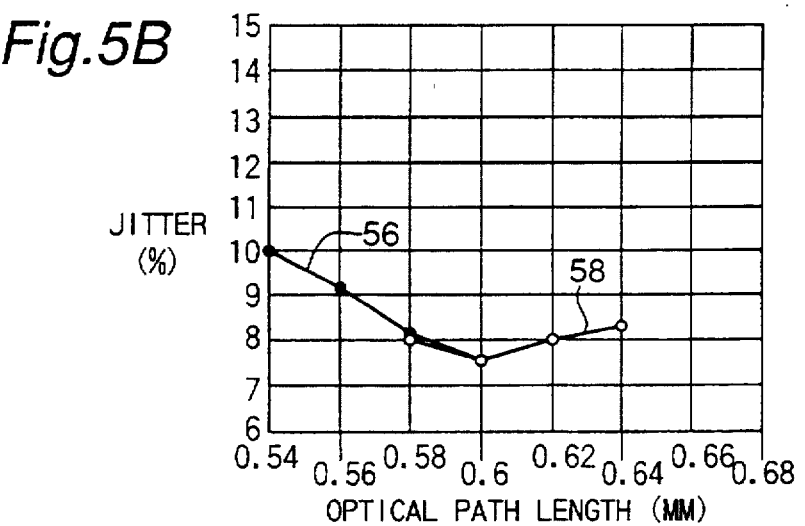
FIG. 5B is a graph similar to FIG. 5A, but when the space layer has a thickness of about 40 μm.
Figure 5C:
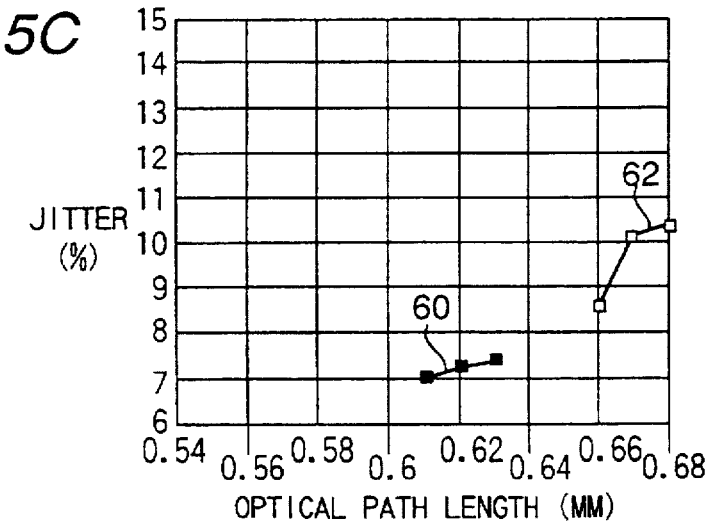
FIG. 5C is a graph similar to FIG. 5A, but when the space layer has a thickness of about 50 μm.
Figure 6A:
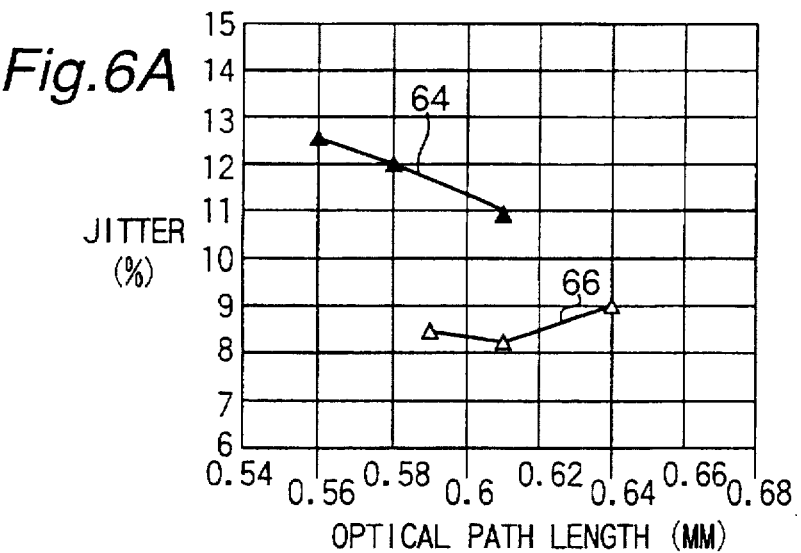
FIG. 6A is a graph indicating jitters of signals played back from the optical disc of FIG. 4 when the space layer has a thickness of about 30 μm.
Figure 6B:
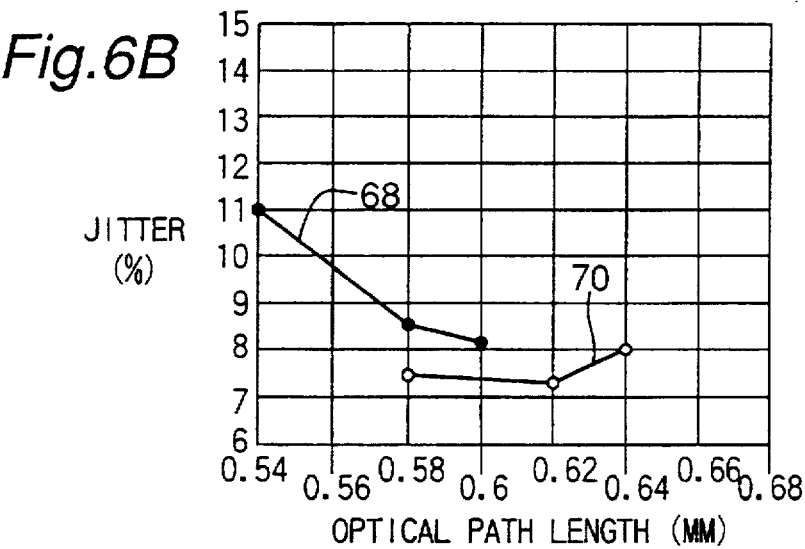
FIG. 6B is a graph similar to FIG. 6A, but when the space layer has a thickness of about 40 μm.
Figure 6C:
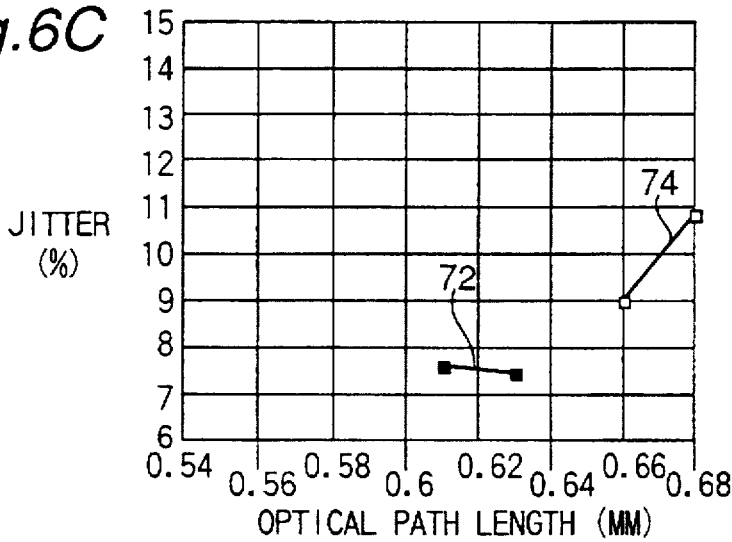
FIG. 6C is a graph similar to FIG. 6A, but when the space layer has a thickness of about 50 μm.

FIGS. 5A to 5C are graphs indicating jitters of signals played back from the optical disc of Embodiment 1 manufactured by way of trial, while FIGS. 6A to 6C are graphs indicating jitters of signals played back from the optical disc of Embodiment 3 manufactured by way of trial. In these graphs, the vertical axis indicates the jitters of the played-back signals, while the horizontal axis indicates the distance from the plane on which the playback laser beam is incident to the signal plane to be played back (the length of an optical path).

The graph of FIG. 5A indicates measurement results obtained when three kinds of optical discs were played back wherein substrates having thickness in the rangees of about 0.54 mm, 0.56 mm, and 0.58 mm were used for the first signal layer 2. The space layer 6 was rendered to have a thickness in the range of about 30 μm. The semitransparent film 4 was rendered to have a reflectance in the range of about 25% with respect to light incident on the first signal layer 2. The reflective film 10 was rendered to have a reflectance in the range greater than 70%. The thickness in the range of the second signal layer 8 was selected so that the total thickness in the range of the optical disc may range from 1.14 mm to 1.5 mm.

In FIG. 5A, reference numerals 52 and 54 indicate the measurement results obtained when information recorded on the first signal layer 2 and that recorded on the second signal layer 8 were played back, respectively.

The graph of FIG. 5B indicates measurement results obtained when four kinds of optical discs were played back wherein substrates having thickness in the rangees of about 0.54 mm, 0.56 mm, 0.58 mm, and 0.6 mm were used for the first signal layer 2. The space layer 6 was rendered to have a thickness in the range of about 40 μm. The semitransparent film 4 was rendered to have a reflectance in the range of about 25% with respect to light incident on the first signal layer 2. The reflective film 10 was rendered to have a reflectance in the range greater than 70%. The thickness in the range of the second signal layer 8 was selected so that the total thickness in the range of the optical disc may range from 1.14 mm to 1.5 mm.

In FIG. 5B, reference numerals 56 and 58 indicate the measurement results obtained when information recorded on the first signal layer 2 and that recorded on the second signal layer 8 were played back, respectively.

The graph of FIG. 5C indicates measurement results obtained when three kinds of optical discs were played back wherein substrates having thickness in the rangees of about 0.6 mm, 0.6 mm, and 0.6 mm were used for the first signal layer 2. The space layer 6 was rendered to have a thickness in the range of about 50 μm. The semitransparent film 4 was rendered to have a reflectance in the range of about 25% with respect to light incident on the first signal layer 2. The reflective film 10 was rendered to have a reflectance in the range greater than 70%. The thickness in the range of the second signal layer 8 was selected so that the total thickness in the range of the optical disc may range from 1.14 mm to 1.5 mm.

In FIG. 5C, reference numerals 60 and 62 indicate the measurement results obtained when information recorded on the first signal layer 2 and that recorded on the second signal layer 8 were played back, respectively.

When the signal planes of the optical disc are played back, it should be taken into consideration that individual optical discs are likely to contain some manufacturing variations such as, for example, warps, eccentricity, birefringence, and that individual pickup heads are likely to similarly contain some manufacturing variations. In view of this fact, the jitters of the played-back signals must be maintained below 10%.

The graph of FIG. 5A reveals that the space layer 6 having a thickness in the range of about 30 μm does not satisfy the jitter limit of being less than 10%. It is conceivable that because the space layer 6 is thin, when information recorded on one of the two signal layers is desired to be played back, that recorded on the other is also played back, thus creating the so-called cross talk between the two signal layers and deteriorating the jitters of the played-back signals.

The graph of FIG. 5B reveals that if the space layer 6 having a thickness in the range of about 40 μm is employed, the substrate of the first signal layer 2 is required to have a thickness in the range greater than 0.54 mm to satisfy the jitter limit of being less than 10%. Furthermore, if an object lens having a numerical aperture (NA) of about 0.6 is employed to best focus a laser beam therefrom on a position of a depth of about 0.6 mm from the incident plane, the jitters of the played-back signals from the two signal planes can be substantially equalized by positioning the two signal planes to be equidistant from such position along the optical axis OA.

The graph of FIG. 5C reveals that if the space layer 6 having a thickness in the range of about 50 μm is employed, the distance between the incident plane and the second signal plane is required to be less than 0.66 mm in order to satisfy the jitter limit of being less than 10%.

Regarding the dual-layered optical disc of Embodiment 1, however, it is necessary to highly control the manufacturing variations in thickness in the range of the semitransparent film 4 and the reflective film 10 deposited on the associated signal planes and those in thickness in the range of the substrates 2 and 8 and the space layer 6. In the actual manufacturing process, the control required for depositing the semitransparent film 4 necessitates a margin of about 15% in reflectance in the range.

FIGS. 6A to 6C are graphs indicating reflectance in the range limits of the semitransparent film 4 and the reflective film 10 up to which the playback apparatus can recognize information on the optical disc even if there are some manufacturing deviations. These graphs have been obtained by measuring jitters of signals played back from the optical disc of Embodiment 3 manufactured by way of trial.

The graph of FIG. 6A indicates measurement results obtained when three kinds of optical discs were played back wherein substrates having thickness in the rangees of about 0.56 mm, 0.58 mm, and 0.61 mm were used for the first signal layer 42. The space layer 46 was rendered to have a thickness in the range of about 30 μm. The semitransparent film 44 was rendered to have a reflectance in the range of about 20% with respect to light incident on the first signal layer 42. The reflective film 50 was rendered to have a reflectance in the range greater than 70%. The thickness in the range of the substrate of the second signal layer 48 was selected so that the total thickness in the range of the optical disc may range from 1.14 mm to 1.5 mm.

In FIG. 6A, reference numerals 64 and 66 indicate the measurement results obtained when information recorded on the first signal layer 42 and that recorded on the second signal layer 48 were played back, respectively.

The graph of FIG. 6B indicates measurement results obtained when three kinds of optical discs were played back wherein substrates having thickness in the rangees of about 0.54 mm, 0.58 mm, and 0.6 mm were used for the first signal layer 42. The space layer 46 was rendered to have a thickness in the range of about 40 μm. The semitransparent film 44 was rendered to have a reflectance in the range of about 20% with respect to light incident on the first signal layer 42. The reflective film 50 was rendered to have a reflectance in the range greater than 70%. The thickness in the range of the second signal layer 48 was selected so that the total thickness in the range of the optical disc may range from 1.14 mm to 1.5 mm.

In FIG. 6B, reference numerals 68 and 70 indicate the measurement results obtained when information recorded on the first signal layer 42 and that recorded on the second signal layer 48 were played back, respectively.

The graph of FIG. 6C indicates measurement results obtained when two kinds of optical discs were played back wherein substrates having thickness in the rangees of about 0.61 mm and 0.63 mm were used for the first signal layer 42. The space layer 46 was rendered to have a thickness in the range of about 50 μm. The semitransparent film 44 was rendered to have a reflectance in the range of about 20% with respect to light incident on the first signal layer 42. The reflective film 50 was rendered to have a reflectance in the range greater than 70%. The thickness in the range of the second signal layer 48 was selected so that the total thickness in the range of the optical disc may range from 1.14 mm to 1.5 mm.

In FIG. 6C, reference numerals 72 and 74 indicate the measurement results obtained when information recorded on the first signal layer 42 and that recorded on the second signal layer 48 were played back, respectively.

From the above results obtained obtained by playing back the dual-layered optical disc of Embodiment 3, it has been known that the jitter values are greater when information on the first signal layer 42 has been played back than when information on the second signal layer 48 has been played back. The reason for this is that the amount of light returning from the semitransparent film 44 to the pickup head differs from that of light returning from the reflective film 50 to the pickup head. Because the amount of light returning from the first signal plane positioned on the incident side of the optical disc is lesser than that of light returning from the second signal plane, noise components generated during conversion of optical signals detected by the light detector into electric signal have influence upon the jitter values.

The graph of FIG. 6A reveals that the space layer 46 having a thickness in the range of about 30 μm does not satisfy the jitter limit of being less than 10%. As is the case with Embodiment 1, it is conceivable that because the space layer 46 is thin, when information recorded on one of the two signal layers is desired to be played back, information recorded on the other signal layer is also played back, thus creating the so-called cross talk between the two signal layers and deteriorating the jitters of the played-back signals.

The graph of FIG. 6B reveals that if the space layer 46 having a thickness in the range of about 40 μm is employed, the substrate of the first signal layer 42 is required to have a thickness in the range greater than 0.56 mm to satisfy the jitter limit of being less than 10%. Furthermore, it is known from the graph of FIG. 6B that when the substrate of the first signal layer 42 has a thickness in the range of about 0.6 mm, the jitter value is 8.1% when information on the first signal plane has been played back, while the jitter value is 8.0% and is hence approximately equal thereto when information on the second signal plane has been played back. Although the amount of light returning from the semitransparent film 44 is, when information on the first signal plane is played back, relatively small and is hence likely influenced by external noises, this influence is reduced by minimizing aberration, i.e., by positioning the first signal plane on the focus position, about 0.6 mm spaced away from the incident plane, where the laser beam from the pickup head is best focused. In contrast, when information on the second signal plane remote from the incident plane is played back, the jitters become deteriorated due to enlarged aberration which has been caused by the second signal plane being positioned at a location spaced about 40 μm, corresponding to the thickness of the space layer 46, from the focus position. This jitter deterioration is reduced by enlarging the amount of light returning from the reflective film 50 deposited on the second signal plane.

More specifically, when information on the two signal planes is played back, the jitters can be substantially equalized by positioning the focus position at a location between the semitransparent film 44 and approximately the center of the space layer 46 along the optical axis OA with the reflectance in the range of the semitransparent film 44 appropriately selected so that the amount of light returning from the reflective film 50 may be greater than the amount of light returning from the semitransparent film 44.

In consideration of the manufacturing variations of optical discs, the following values are considered appropriate:

Reflectance of semitransparent or reflective film: about 20–40%

Thickness of first signal layer substrate: about 0.56–0.58 mm (optical path length to first signal plane)

Thickness of space layer: about 40–60 μm (optical path length to second signal plane: less than 0.64 mm)

Although in Embodiment 3 the intensity of light reflected by the reflective film and returning to the pickup head has been described as being greater than the intensity of light reflected by the semitransparent film, it may be possible to make the former smaller than the latter.

In other words, when information on the two signal planes is played back, the jitters can be substantially equalized by positioning the focus position at a location between the reflective film 50 and approximately the center of the space layer 46 along the optical axis OA with the reflectance in the range of the semitransparent film 44 appropriately selected so that the amount of light returning from the reflective film 50 may be smaller than the amount of light returning from the semitransparent film 44.

As discussed hereinabove, according to Embodiment 3, even if the two signal planes are positioned at different distances from the focus position of the pickup head, the jitters can be substantially equalized by differentiating the amount of returning light from the semitransparent film and the amount of returning light from the reflective film.

In the above-described dual-layered optical disc, the semitransparent film and the reflective film may have a reflectance in the range of about 30% and a reflectance in the range greater than 70%, respectively.

Furthermore, the jitters of signals played back from the two signal planes can be substantially equalized using a pickup head having a specific numerical aperture (NA) capable of positioning the focus position on the side of a signal plane from which a lesser amount of light is returned to the pickup head, or by appropriately selecting the wavelength of a laser beam emitted from a semiconductor laser.

As is clear from the above, according to the present invention, because the focus position where the read laser beam is best focused is positioned between the two signal planes, the jitters of signal played back therefrom can be substantially equalized, thus making it possible to unify the quality of the played-back signals.

Furthermore, when the two signal planes are positioned equidistantly from the focus position along an optical axis, aberrations on the signal planes are substantially the same and, hence, the diameter of the laser beam focused thereon during playback is maintained substantially constant. Also, because the intensity of light returning from one of the two signal planes is approximately equal to the intensity of light returning from the other signal plane, signals played back therefrom are equally affected by noise. Accordingly, information recorded on the two signal planes is played back under substantially the same conditions.

If the two signal layers having the same thickness in the range are employed, the same substrates can be used therefor.

Moreover, if the thickness in the range of the second signal layer remote from the incident plane is made greater by about half the thickness in the range of the space layer than the thickness in the range of the first signal layer positioned on the incident side of the optical disc, a generally available substrate can be used for the second signal layer without adjusting the thickness in the range thereof.

If one of the signal planes is positioned farther from the focus position than the other signal plane, the one signal plane is largely affected by aberration. Even in this case, influence by noise can be reduced by increasing the intensity of light returning from the semitransparent or reflective film deposited thereon to the pickup head. On the other hand, because the other signal plane is positioned close to the focus position and is, hence, not so much affected by aberration, the intensity of light returning from the reflective or semitransparent film deposited thereon to the pickup head may be reduced. By so doing, the quality of played-back signals can be equalized.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A dual-layered optical disk for use with a pickup head, said dual-layered optical disk comprising:

a first signal layer having a thickness in the range in the range of 0.56 mm to 0.58 mm;

a semitransparent film deposited on said first signal layer and having a reflectance in the range in the range of 20% to 40%;

a space layer deposited on said semitransparent film and having a thickness in the range in the range of 40 μm to 60 μm;

a reflective film deposited on said space layer and having a reflectance in the range greater than 70%;

a second signal layer deposited on said reflective film;

a plurality of first signal pits formed on a side of said first signal layer which confronts said semitransparent film; and a plurality of second signal pits formed on a side of said second signal layer which confronts said reflective film;

wherein an optimal focus position, for a laser beam emitted from the pickup head, is positioned between said plurality of first signal pits and said plurality of second signal pits when the laser beam is incident on said first signal layer along an optical axis generally perpendicular to said first signal layer.

2. A dual-layered optical disk as claimed in claim 1, wherein said second signal layer has a thickness equivalent to about half the thickness of said space layer added to the thickness of said first signal layer.

3. A dual-layered optical disk for use with a pickup head, said dual-layered optical disk comprising:

a first signal layer having a thickness in the range in the range of 0.56 mm to 0.58 mm;

a semitransparent film deposited on said first signal layer and having a reflectance in the range in the range of 20% to 40%;

a space layer deposited on said semitransparent film and having a thickness in the range in the range of 40 μm to 60 μm;

a reflective film deposited on said space layer and having a reflectance in the range greater than 70%;

a second signal layer deposited on said reflective film;

a plurality of first signal pits formed on a side of said first signal layer which confronts said semitransparent film; and a plurality of second signal pits formed on a side of said second signal layer which confronts said reflective film;

wherein an optimal focus position, for a laser beam emitted from the pickup head, is positioned between said semitransparent film and an approximate center of said space layer when the laser beam is incident on said first signal layer along an optical axis generally perpendicular to said first signal layer, and wherein an intensity of light returning from said reflective film is greater than an intensity of light returning from said semitransparent film during a playback of said plurality of first signal pits and said plurality of second signal pits.

4. A dual-layered optical disk for use with a pickup head, said dual-layered optical disk comprising:

a first signal layer having a thickness in the range in the range of 0.56 mm to 0.58 mm;

a semitransparent film deposited on said first signal layer and having a reflectance in the range in the range of 20% to 40%;

a space layer deposited on said semitransparent film and having a thickness in the range in the range of 40 μm to 60 μm;

a reflective film deposited on said space layer and having a reflectance in the range greater than 70%;

a second signal layer deposited on said reflective film;

a plurality of first signal pits formed on a side of said first signal layer which confronts said semitransparent film; and a plurality of second signal pits formed on a side of said second signal layer which confronts said reflective film;

wherein an optimal focus position, for a laser beam emitted from the pickup head, is positioned between said reflective film and an approximate center of said space layer when the laser beam is incident on said first signal layer along an optical axis generally perpendicular to said first signal layer, and wherein an intensity of light returning from said semitransparent film is greater than an intensity of light returning from said reflective film during a playback of said plurality of first signal pits and said plurality of second signal pits.

5. A pickup head for use with a dual-layered optical disk wherein the dual-layered optical disk has a first signal layer having a thickness in the range in the range of 0.56 mm to 0.58 mm, a semitransparent film having a reflectance in the range of 20% to 40%, a space layer having a thickness in the range of 40 μm to 60 μm, a reflective film having a reflectance in the range greater than 70%, and a second signal layer, all of which are layered in this order, said pickup head comprising:

a light source operable so as to emit a laser beam; and at least one lens for focusing the laser beam emitted from said light source such that an optimal focus position of the laser beam on the optical disk is positioned between the semitransparent film and an approximate center of the space layer when the laser beam is incident on the first signal layer along an optical axis generally perpendicular to the first signal layer, and such that an intensity of light returning from the reflective film is greater than an intensity of light returning from the semitransparent film during a playback of the dual-layered optical disk.

6. A pickup head for use with a dual-layered optical disk wherein the dual-layered optical disk has a first signal layer having a thickness in the range in the range of 0.56 mm to 0.58 mm, a semitransparent film having a reflectance in the range of 20% to 40%, a space layer having a thickness in the range of 40 μm to 60 μm, a reflective film having a reflectance in the range greater than 70%, and a second signal layer, all of which are layered in this order, said pickup head comprising:

a light source operable so as to emit a laser beam; and at least one lens for focusing the laser beam emitted from said light source such that an optimal focus position of the laser beam on the optical disk is positioned between the reflective film and an approximate center of the space layer when the laser beam is incident on the first signal layer along an optical axis generally perpendicular to the first signal layer, and such that an intensity of light returning from the semitransparent film is greater than an intensity of light returning from the reflective film during a playback of the dual-layered optical disk.

* * * * *